(12) United States Patent
Panigrahy et al.

(10) Patent No.: US 9,330,063 B2
(45) Date of Patent: May 3, 2016

(54) GENERATING A SPARSIFIER USING GRAPH SPANNERS

(71) Applicant: Microsoft Corporation, Redmond, WA (US)

(72) Inventors: Rina Panigrahy, San Ramon, CA (US); Mikhail Kapralov, Stanford, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 643 days.

(21) Appl. No.: 13/650,145

(22) Filed: Oct. 12, 2012

(65) Prior Publication Data

US 2014/0104278 A1   Apr. 17, 2014

(51) Int. Cl.
*G06T 11/20* (2006.01)
*G06F 17/10* (2006.01)

(52) U.S. Cl.
CPC ..................................... *G06F 17/10* (2013.01)

(58) Field of Classification Search
CPC ... G06T 11/206; G06F 3/0481; G06F 17/246; H04L 12/2458; G06Q 10/10
See application file for complete search history.

(56) References Cited

U.S. PATENT DOCUMENTS

| | | | |
|---|---|---|---|
| 7,492,727 B2 | 2/2009 | Yu et al. | |
| 7,778,945 B2 | 8/2010 | Gunawardana et al. | |
| 7,933,915 B2 | 4/2011 | Singh et al. | |
| 7,990,846 B2 | 8/2011 | Alicherry et al. | |
| 8,605,085 B1 * | 12/2013 | Moreton | 345/423 |
| 8,711,146 B1 * | 4/2014 | Miller et al. | 345/440 |
| 2007/0076001 A1 * | 4/2007 | Brand | 345/440 |
| 2007/0230488 A1 * | 10/2007 | Yu et al. | 370/408 |
| 2010/0156853 A1 * | 6/2010 | Narusawa | 345/183 |
| 2011/0187717 A1 * | 8/2011 | Jagannath et al. | 345/440 |
| 2011/0202846 A1 | 8/2011 | Najork et al. | |
| 2011/0307838 A1 * | 12/2011 | Dwyer et al. | 715/854 |
| 2013/0335422 A1 * | 12/2013 | Saund | 345/440 |

OTHER PUBLICATIONS

Althoger; Ingo et al.; "On Sparse Spanners of Weighted Graphs"; 1993; Discrete & Computational Geometry; 9:81-100.*
Althofer, et al., "On Sparse Spanners of Weighted Graphs", Retrieved at <<http://www.cs.bgu.ac.il/~elkinm/teaching/embed_proj/autumn10/Althofer.pdf>>, In Journal of Discrete & Computational Geometry, vol. 9, Issue 1, Jul. 6, 2012, pp. 20.

(Continued)

*Primary Examiner* — Todd Buttram
(74) *Attorney, Agent, or Firm* — Sandy Swain; Micky Minhas

(57) ABSTRACT

A sparsifier is generated from a union of multiple spanners of a graph. The edges of the sparsifier are weighted based on a measure of connectivity called robust connectivity. The robust connectivity of a node pair is the highest edge sampling probability at which a distance between the pair is likely to drop below a specified length. Each spanner is generated from a subgraph of the graph that is generated using a decreasing sampling probability. For the weight of each edge, a spanner is determined where an estimated distance between the nodes associated with the edge is greater than a threshold distance. The sampling probability of the subgraph used to generate the spanner is an estimate of the robust connectivity of the edge. The weight of the edge is set to the inverse of the estimated robust connectivity.

19 Claims, 5 Drawing Sheets

(56) References Cited

OTHER PUBLICATIONS

Baswana, Surender., "Streaming Algorithm for Graph Spanners—Single Pass and Constant Processing Time Per Edge", Retrieved at <<http://www.cse.iitk.ac.in/users/sbaswana/Papers-published/stream-spanner.pdf/>>, In Journal of Information Processing Letters, vol. 106, Issue 3, Apr. 2008, pp. 6.

Baswana, et al., "Additive Spanners and (Alpha, Beta)-Spanners", Retrieved at <<http://citeseerx.ist.psu.edu/viewdoc/download;jsessionid=E566D56531BAA06BC8300F782A96DB9D?doi=10.1.1.114.1960&rep=rep1&type=pdf>>, In Journal of ACM Transactions on Algorithms, vol. 7, Issue 1, Nov. 2010, pp. 21.

Baswana, et al., "A Simple Linear Time Algorithm for Computing a (2k-1)-Spanner of O(n1+1/k) Size in Weighted Graphs", Retrieved at <<http://repository.ias.ac.in/90259/1/26_Auth.pdf>>, In Proceedings of the 30th International Conference on Automata, Languages and Programming, Jun. 2003, pp. 11.

Fung, et al., "A General Framework for Graph Sparsification", Retrieved at <<http://www.cs.ubc.ca/~nickhar/Publications/Sparsifier/Sparsifier-STOC.pdf>>, In Proceedings of the 43rd Annual ACM Symposium on Theory of Computing, Jun. 6, 2011, pp. 10.

Koutis, et al., "Approaching Optimality for Solving SDD Linear Systems", Retrieved at <<http://ieeexplore.ieee.org/stamp/stamp.jsp?tp=&arnumber=5671167>>, In Proceedings of the 2010 IEEE 51st Annual Symposium on Foundations of Computer Science, Oct. 23, 2010, pp. 10.

Mendel, et al., "Ramsey Partitions and Proximity Data Structures", Retrieved at <<http://www.cims.nyu.edu/~naor/homepage%20files/RamseyProximity-focs.pdf>>, In Proceedings of the 47th Annual IEEE Symposium on Foundations of Computer Science, Oct. 2006, pp. 10.

Spielman, et al., "Graph Sparsification by Effective Resistances", Retrieved at <<http://www.cs.cornell.edu/~abrahao/tdg/papers/p563.pdf>>, In Proceedings of the 40th Annual ACM Symposium on Theory of Computing, May 17, 2008, pp. 6.

Spielman, et al., "Spectral Sparsification of Graphs", Retrieved at <<http://arxiv.org/pdf/0808.4134v1.pdf>>, In SIAM Journal on Computing, vol. 40, Issue 4, Aug. 29, 2008, pp. 42.

Thorup, et al., "Approximate Distance Oracles", Retrieved at <<http://citeseerx.ist.psu.edu/viewdoc/download?doi=10.1.1.3.5726&rep=rep1&type=pdf>>, In Proceedings of the Thirty-Third Annual ACM Symposium on Theory of Computing, Feb. 9, 2001, pp. 23.

Thorup, et al., "Spanners and Emulators with Sublinear Distance Errors", Retrieved at <<http://web.eecs.umich.edu/~pettie/theoryseminar/papers/Thorup-Zwick-sublinear-additive-error.pdf>>, In Proceedings of the Seventeenth Annual ACM-SIAM Symposium on Discrete Algorithm, Jan. 22, 2006, pp. 8.

Connamacher, et al., "The Complexity of Minimizing Certain Cost Metrics for k-Source Spanning Trees", Retrieved at <<http://www.sciencedirect.com/science/article/pii/S0166218X02004201>>, Journal of Discrete Applied Mathematics, vol. 131, Issue 1, Sep. 2003, pp. 15.

Gubichev, et al., "Fast and Accurate Estimation of Shortest Paths in Large Graphs", Retrieved at <<http://www.mpi-inf.mpg.de/~sseufert/papers/aspsn-cikm.pdf>>, The 19th ACM Conference on Information and Knowledge Management, Oct. 26, 2010, pp. 10.

Zhao, et al., "Orion: Shortest Path Estimation for Large Social Graphs", Retrieved at <<http://www.cs.ucsb.edu/~ravenben/publications/pdf/orion-wosn10.pdf>>, 3rd Workshop on Online Social Networks, Jun. 2010, pp. 9.

"Determining Affinity in Social Networks", U.S. Appl. No. 13/113,103, filed May 23, 2011, pp. 29.

Baswana, et al., "Approximate Distance Oracles for Unweighted Graphs in Expected O(n2) Time", Retrieved at <<-http://dl.acm.org/citation.cfm?id=1198518>>, In Proceedings of the ACM Transactions on Algorithms, vol. 2, Issue 4, Oct. 2006, pp. 21.

* cited by examiner

GENERATING A SPARSIFIER USING GRAPH SPANNERS

BACKGROUND

Graphs typically include multiple nodes or vertices connected to one another by one or more edges. Graphs are useful for modeling many real world systems such as the World Wide Web and transportation systems such as highways. In particular, graphs are also useful in search engines and social networking applications.

For example, each node in the graph may represent a user account in a social networking application, and each edge in the graph may represent a social networking relationship between two user accounts (e.g., a "friend" relationship). The graph representation of the user accounts may be used to estimate the connectedness of a user account, or to determine the distance between two user accounts.

While graphs are useful, they are often very large and include a large number of edges and nodes. Such large graphs utilize a large amount of memory for storage, and also utilize a large amount of computing resources when performing graph operations. Solutions to the problems associated with large graphs include storing and using representations of the graphs that have fewer edges, rather than the complete graph. Examples of such representations include spanners and sparsifiers. A spanner is a subgraph that can be used to estimate distances between any pairs of nodes up to a constant factor approximation. A sparsifier is a subgraph that can be used to estimate the quadratic form x'Lx (which is a generalization of graph cuts) for any vector x, where L is the Laplacian matrix representation of the graph. However, computing sparsifiers typically includes solving systems of linear equations which is also computationally expensive.

SUMMARY

A sparsifier is generated from a union of multiple spanners of a graph. The edges of the sparsifier are weighted based on a measure of connectivity called robust connectivity. The robust connectivity of a node pair is the highest edge sampling probability at which a distance between the pair is likely to drop below a specified length. Each spanner is generated from a subgraph of the graph that is generated using a decreasing sampling probability. The sparsifier is generated based on the union of the generated spanners. For the weight of each edge, a spanner is determined where an estimated distance between the nodes associated with the edge is greater than a threshold distance. The sampling probability of the subgraph used to generate the spanner is an estimate of the robust connectivity of the edge. The weight of the edge is set to the inverse of the estimated robust connectivity.

In an implementation, a graph is received by a computing device. The graph includes edges, and each edge is associated with two nodes. Subgraphs of the received graph are generated by the computing device. Spanners are generated from the subgraphs by the computing device. A sparsifier is generated using the generated spanners by the computing device. The generated sparsifier is stored by the computing device.

Implementations may include some or all of the following features. Generating the subgraphs from the received graph may include, for each subgraph, sampling edges, and adding the sampled edges to the subgraph. Sampling edges may include randomly sampling edges. A number of edges sampled for each subgraph may decrease according to a rate. The rate may be a geometric rate. Generating the sparsifier using the generated spanners may include generating the sparsifier using a union of the generated spanners. A robust connectivity of each edge in the generated sparsifier may be estimated, and a weight of each edge may be set based on the estimated robust connectivity for the edge. Setting the weight of each edge based on the estimated robust connectivity for the edge may include setting the weight based on the inverse of the robust connectivity. Each spanner may be associated with a sampling probability, and estimating the robust connectivity of an edge in the generated sparsifier may include determining a spanner where an estimated distance between the nodes associated with the edge is greater than a threshold, and estimating the robust connectivity of the edge based on the sampling probability of the determined spanner. The threshold may be based on the number of nodes in the graph. The threshold may be a log of the number of nodes in the graph. The graph may be associated with a social networking application or a search engine.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
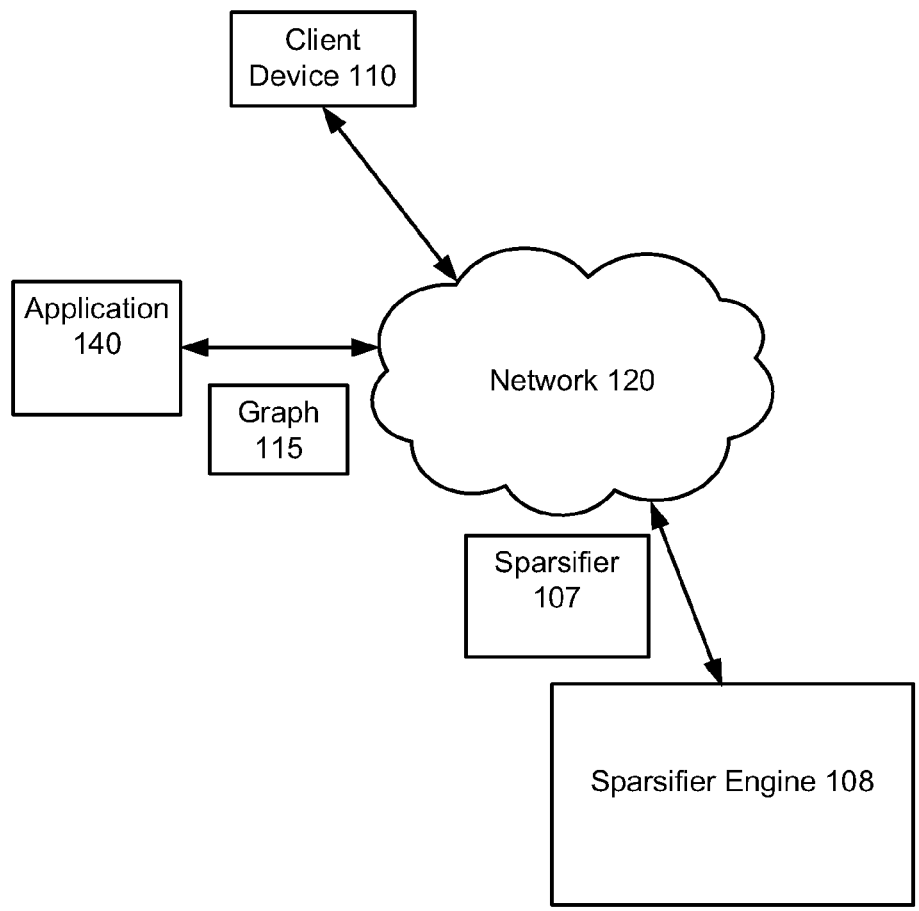
FIG. 1 is an illustration of an example environment for generating a sparsifier from a graph.

FIG. 1 is an illustration of an example environment 100 for generating a sparsifier 107 from a graph 115. The environment 100 may include a client device 110, an application 140, and a sparsifier engine 108 in communication with one another through a network 120. The network 120 may be a variety of network types including the public switched telephone network (PSTN), a cellular telephone network, and a packet switched network (e.g., the Internet). Although shown as comprised within separate devices over the network 120, depending on the implementation, the client device 110, the application 140, and the sparsifier engine 108 may be comprised within a single computing device, or one or more other computing devices that may or may not communicate over the network 120.

In some implementations, the client device 110 may include a desktop personal computer, workstation, laptop, PDA (personal digital assistant), smart phone, cell phone, or any WAP (wireless application protocol) enabled device or any other computing device capable of interfacing directly or indirectly with the network 120. A client device 110 may be implemented using a general purpose computing device such as the computing device 500 described with respect to FIG. 5, for example.

The application 140 may include a variety of Internet or web based applications such as search engines or social networking applications. Users may interact with the application 140 by requesting one or more services provided by the application 140 using the client device 110.

The application 140 may utilize data that is represented by a graph 115. A graph may include a plurality of edges, and each edge may be associated with two nodes or vertices. For example, where the application 140 is a social networking application the graph 115 may include a node for each user account and edges between the nodes that represent social networking relationships between the nodes. Where the application 140 is a search engine, the graph 115 may include a node for each web page indexed by the search engine and edges that represent links between the web pages.

As noted above, while representing data using a graph 115 is a powerful tool, storing and performing operations on a large graph 115 may use a large amount of storage and computing resources. Accordingly, in accordance with embodiments described herein, the environment 100 may further include a sparsifier engine 108. The sparsifier engine 108 may receive a graph 115 and may generate a sparsifier 107 from the graph 115. The sparsifier 107 may be a compressed or reduced version of the graph 115 that allows for the approximate computation of distance queries such as shortest path. The sparsifier 107 may have the property that a number of edges across all cuts of the graph 115 is approximately preserved. The sparsifier 107 may further allow for computations such as effective resistance between nodes.

In some implementations, the sparsifier 107 may be a spectral sparsifier. A spectral sparsifier is a type of sparsifier that not only preserves cuts, but also preserves generalized cuts given by x'Lx where x is a unit norm vector and L is the Laplacian of the graph 115.

By performing graph 115 related computations using the sparsifier 107, rather than the graph 115, significant performance and storage gains may be realized by the application 140. Moreover, as described further with respect to FIG. 2, the sparsifier engine 108 may generate the sparsifier 107 from one or more random spanners, which avoids solving complex linear equation systems.

Figure 2:
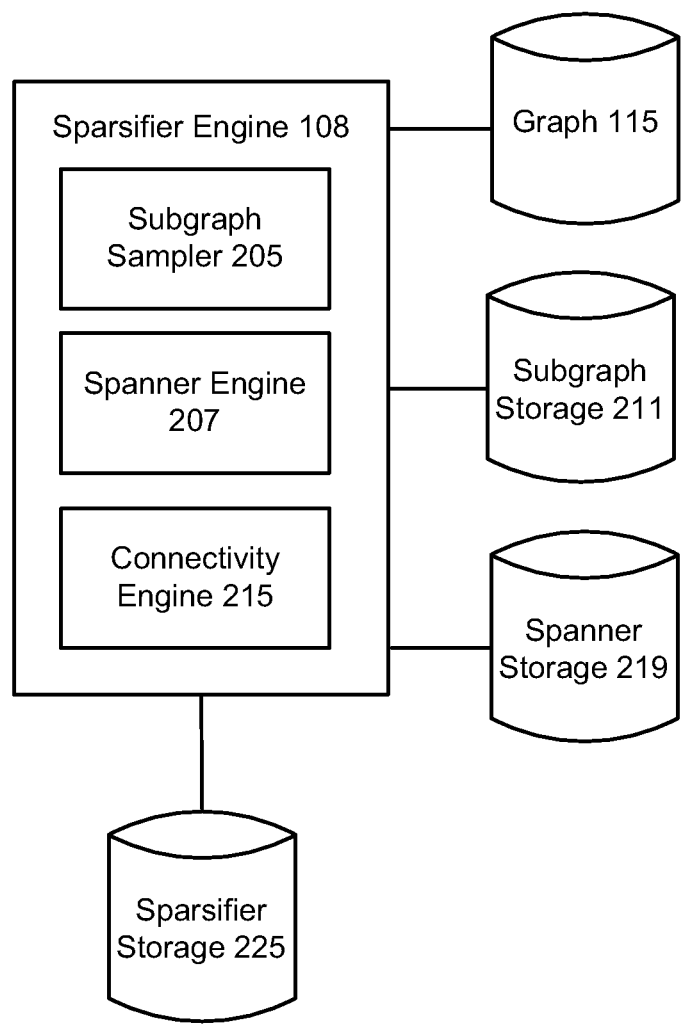
FIG. 2 is an illustration of an example sparsifier engine.

FIG. 2 is an illustration of an example sparsifier engine 108. As shown, the sparsifier engine 108 may include components including, but not limited to, a subgraph sampler 205, a spanner engine 207, and a connectivity engine 215. The sparsifier engine 108 may further include a subgraph storage 211, a spanner storage 219, and a sparsifier storage 225. More or fewer components may be supported. Some or all of the components of the sparsifier engine 108 may be implemented using one or more computing devices such as the computing device 500 illustrated with respect to FIG. 5.

The subgraph sampler 205 may generate one or more subgraphs from the graph 115. The subgraphs may be generated by randomly selecting edges from the graph 115 according to a sampling probability. For example, if the sampling probability is 0.5, the subgraph sampler 205 may generate a subgraph by considering each edge of the graph 115. If a random coin flip is heads, then the subgraph sampler 205 may add the edge to the subgraph. If the random coin flip is tails, then the subgraph sampler 205 may skip the edge. The subgraph sampler 205 may continue until all of the edges in the graph 115 have been considered.

The subgraph sampler 205 may generate subgraphs and store the generated subgraphs in the subgraph storage 211. The number of subgraphs generated may be set by a user or an administrator, for example. In some implementations, each subgraph generated by the subgraph sampler 205 may be generated using a different sampling probability. For example, the subgraph sampler 205 may start with an initial sampling probability such as 1, and may generate a subgraph using the sampling probability of 1. For a next subgraph, the subgraph sampler 205 may generate a subgraph using a lower subgraph probability such as ½. The subgraph sampler 205 may continue generating subgraphs with reduced sampling probabilities until a pre-defined number of subgraphs are generated or the sampling probability is less than a threshold probability. In some implementations, the sampling probabilities may decrease according to a rate, such as a geometric rate (e.g., 1, ½, ¼, ⅛ . . . ). Other rates may be used.

The spanner engine 207 may generate spanners from each of the generated subgraphs in the subgraph storage 211. A spanner is a type of subgraph that preserves distances between nodes of the graph 115 to within an approximation factor. The approximation factor may be set by a user or an administrator, for example. In some implementations, the approximation factor may be based on the number of nodes in the graph 115. For example, the approximation factor used by the spanner engine 207 may be the log of the number of nodes in the graph 115. Any method or technique for generating spanners from each of the subgraphs may be used. One such algorithm is the well known Thorup-Zwick algorithm. The generated spanners may be stored by the spanner engine 207 in the spanner storage 219.

In some implementations, the spanner engine 207 may generate a spanner from a subgraph by considering each edge in the subgraph. If the edge, when added to the edges already in the spanner, does not form a cycle of a length that is smaller than the approximation factor, then the edge may be added to the spanner. Otherwise, the edge may be skipped and a next edge in the subgraph may be considered.

The sparsifier engine 108 may generate a sparsifier 107 based on the generated spanners in the spanner storage 219. In some implementations, the sparsifier engine 108 may generate the sparsifier 107 by taking the union of the spanners in the spanner storage 219. The sparsifier engine 108 may store the resulting sparsifier 107 in the sparsifier storage 225. In addition, the sparsifier 107 may be provided to one or more applications such as the application 140.

In some implementations, the connectivity engine 215 may generate a value for each edge in the generated sparsifier 107. The generated value for an edge may be used by the sparsifier engine 108 to weight the edge in the sparsifier 107. The connectivity engine 215 may generate each value by calculating what is referred to herein as the robust connectivity. The robust connectivity for an edge between the nodes u and v is the highest edge sampling probability at which a distance between the nodes u and v in the graph 115 is likely to drop below a specified length k. The value of k may be selected by a user or administrator. In some implementations, k may be set to log(n) where n is the number of nodes in the graph 115.

The sparsifier engine 108 may weight each edge in the generated sparsifier 107 using the robust connectivity measure estimated by the connectivity engine 215 for the edge. In some implementations, the sparsifier engine 108 may set the weight for each edge to be the inverse of the robust connectivity measure estimated for the edge by the connectivity engine 215. The sparsifier 107 with the generated weights may be stored in the sparsifier storage 225. Other methods or techniques for calculating a weight from the robust connectivity measure may be used.

The connectivity engine 215 may calculate the robust connectivity measure for each edge in the sparsifier 107 using the generated spanners in the spanner storage 219. In some implementations, the connectivity engine 215 may estimate the robust connectivity measure for an edge in the sparsifier 107 by, for each of the generated spanners, determining if a distance between the nodes u and v of the edge is at least k within a specified threshold probability. For example, the threshold probability may be ½. Other probabilities may be used.

Of the generated spanners that meet the distance criteria, the connectivity engine 215 may select the generated spanner that was generated from a subgraph with the greatest associated sampling probability. The sampling probability may be used by the connectivity engine 215 as the estimated robust connectivity measure for the edge.

Alternatively, rather than determine the distance for each of the generated spanners, the connectivity engine 215 may start with the spanner with the greatest associated sampling probability. Once a spanner with a determined distance between the nodes u and v of the edge under consideration that is at least k within the threshold probability, the connectivity engine 215 may return the sampling probability of the spanner as the robust connectivity measure for the edge.

The connectivity engine 215 may determine the distance between two nodes in a spanner using any of a variety of methods for determining distances between nodes. In some implementations, the connectivity engine 215 may determine the distance using a Thorup-Zwick oracle. Other methods may be used.

As may be appreciated, the robust connectivity of an edge as described herein is related to the concept of the electrical resistance of an edge. In particular, the robust connectivity of an edge of the sparsifier 107 generated using the methods described herein is an upper bound of the resistance of the edge. In addition, just like resistance, the total robust connectivity of all of the edges in the sparsifier 107 has a bounded sum.

Figure 3:
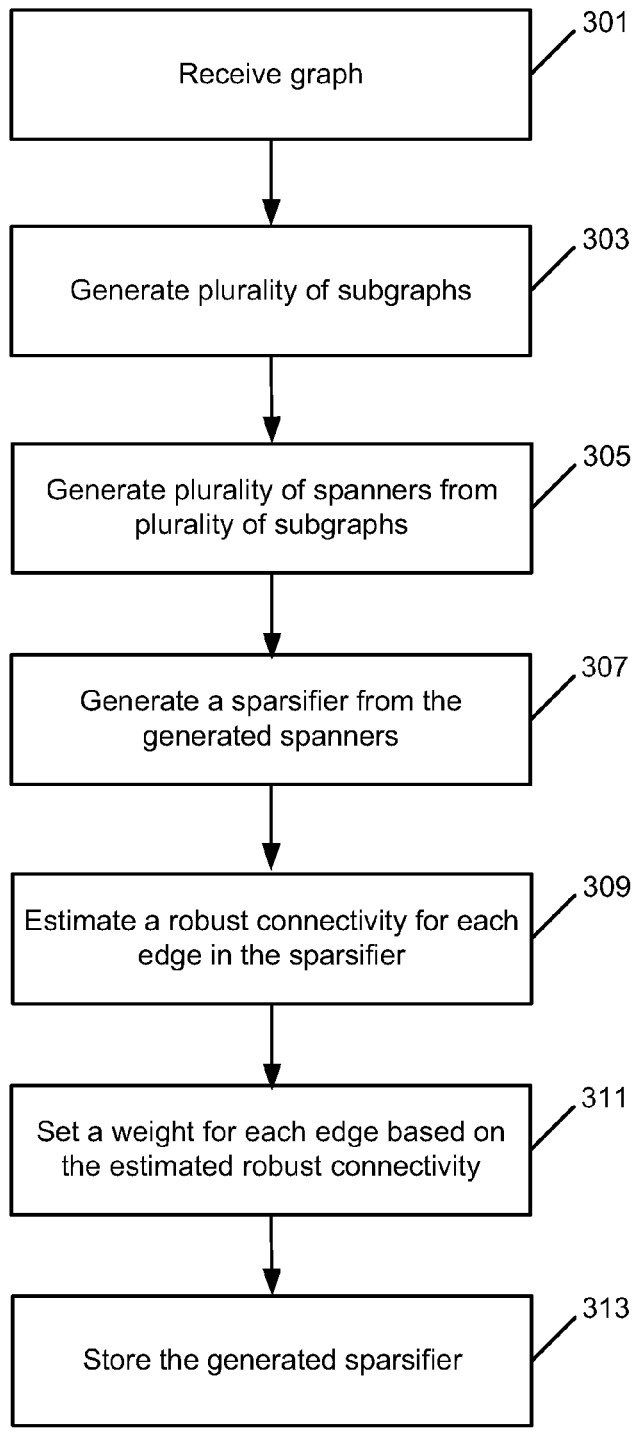
FIG. 3 is an operational flow of an implementation of a method for generating a sparsifier.

FIG. 3 is an operational flow of a method 300 for generating a sparsifier. The method 300 may be implemented by the sparsifier engine 207 in an implementation.

A graph is received at 301. In an implementation, the graph 115 may be received by the sparsifier engine 108. The graph 115 may include a plurality of edges and each edge may be associated with two nodes. In some implementations, the graph 115 may be received by the sparsifier engine 108 from an application 140. The application 140 may be a web or Internet based application such as a social networking application.

A plurality of subgraphs is generated at 303. The plurality of subgraphs may be generated by the subgraph sampler 205 of the sparsifier engine 108. In some implementations, each subgraph may have an associated sampling probability, and the subgraph sampler 205 may generate a subgraph by sampling edges from the graph 115 according to the sampling probability. Each subgraph may have a different associated sampling probability, and the sampling probability used to generate each subgraph may be reduced for each subsequently generated subgraph according to a rate. The rate may be a geometric rate, for example. Other rates may be used. The generated subgraphs may be stored in the subgraph storage 211.

A plurality of spanners is generated from the plurality of subgraphs at 305. The plurality of spanners may be generated by the spanner engine 207 of the sparsifier engine 108. The spanner engine 207 may generate a spanner for each of the subgraphs in the subgraph storage 211. Each of the spanners may be associated with the sampling probability of the subgraph that it was generated from. Any system, method, or technique for generating a spanner from a graph may be used.

The generated spanners may be stored in the spanner storage 219 by the spanner engine 207.

A sparsifier is generated from the generated spanners at 307. The sparsifier 107 may be generated by the sparsifier engine 108 using the spanners from the spanner storage 219. In some implementations, the sparsifier engine 108 may generate the sparsifier 107 by taking the union of the edges of the spanners from the spanner storage 219.

A robust connectivity for each edge in the sparsifier is estimated at 309. The robust connectivity for each edge may be estimated by the connectivity engine 215 of the sparsifier engine 108. In some implementations, the connectivity engine 215 may estimate the robust connectivity for an edge by determining a spanner from the spanner storage 219 where the estimated distance between the nodes associated with the edge in the graph 115 is greater than a threshold. In some implementations, the threshold may be based on the number of nodes in the graph 115. For example, the threshold may be the log of the number of nodes in the graph 115. The estimated robust connectivity may be set to the sampling probability of the determined spanner from the spanner storage 219.

A weight is set for each edge based on the estimated robust connectivities at 311. The weight may be set by the sparsifier engine 108. In some implementations, the weight for an edge may be set to the inverse of the estimated robust connectivity for the edge. Other weights or weighting techniques may be used.

The generated sparsifier is stored at 313. The generated sparsifier 107, including weights, may be stored in the sparsifier storage 225 by the sparsifier engine 108. In some implementations, the sparsifier engine 108 may also provide the generated sparsifier 107 to an application 140.

Figure 4:
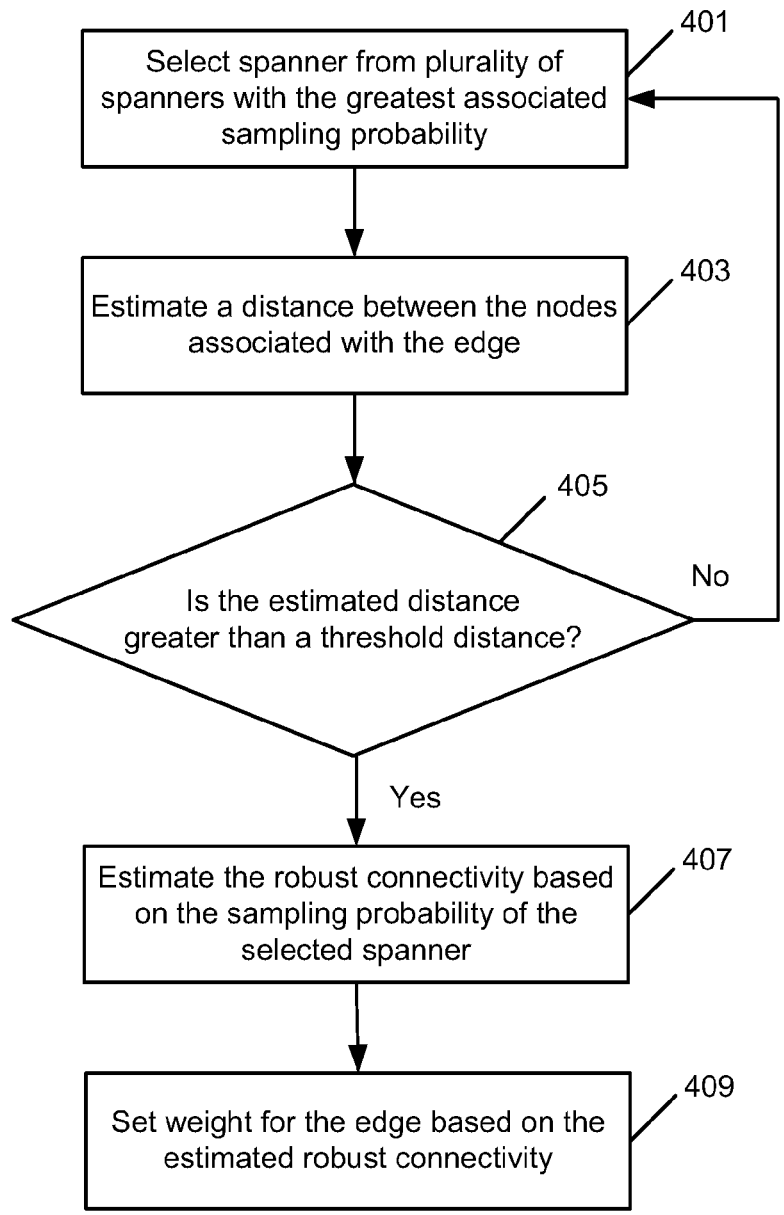
FIG. 4 is an operational flow of an implementation of a method for setting a weight for an edge in a sparsifier.

FIG. 4 is an operational flow of a method 400 for setting a weight for an edge in a sparsifier. The method 400 may be implemented by the connectivity engine 215 of the sparsifier engine 108, for example.

A spanner from a plurality of spanner is selected at 401. The spanner may be selected from the spanners in the spanner storage 219 by the sparsifier engine 108. In some implementations, the selected spanner may be the spanner with the greatest associated sampling probability. As described previously, each spanner may be associated with the sampling probability used to generate the subgraph that was used to create the spanner. The spanner may be selected in order to set a weight for an edge of the sparsifier 107.

A distance between the nodes associated with the edge is estimated at 403. The distance may be estimated by the connectivity engine 215 of the sparsifier engine 108. The distance may be the distance between the nodes in the original graph 115. In some implementations, the distance may be estimated by using an oracle such as a Thorup-Zwick distance oracle. Any system, method, or technique for estimating distances between nodes using a spanner may be used.

In some implementations, the estimated distance may have an associated probability. The probability may be the probability that the distance estimated using the spanner reflects the actual distance in the graph 115.

A determination is made as to whether the estimated distance is greater than a threshold distance at 405. The determination may be made by the connectivity engine 215 of the sparsifier engine 108. The threshold distance may be set by a user or an administrator, for example, and may be based on the total number of nodes in the graph 115. In some implementations, the threshold may be the log of the number of nodes in the graph 115. If the estimated distance is greater than the threshold distance, then the method 400 may continue at 407. Otherwise, the method 400 may continue at 401 where another spanner from the spanner storage 219 is selected and considered by the method 400.

In addition, in some implementations, an additional determination may be made at 405 as to whether the probability associated with the estimated distance is greater than a threshold probability. For example, the threshold probability may be ½. Other threshold probabilities may be used. In such implementations, the method 400 may continue at 407 if both the estimated distance is greater than the threshold distance and the probability associated with the estimated distance is greater than the threshold probability. Otherwise, the method 400 may continue at 401.

The robust connectivity of the edge is estimated at 407. The robust connectivity may be estimated based on the sampling probability of the selected spanner by the connectivity engine 215 of the sparsifier engine 108.

The weight for the edge may be set based on the estimated robust connectivity at 409. The weight may be set by the sparsifier engine 108 for the edge in the sparsifier 107. In some implementations, the weight may be the inverse of the estimated robust connectivity. Other methods for determining a weight based on the estimated robust connectivity may be used.

Figure 5:
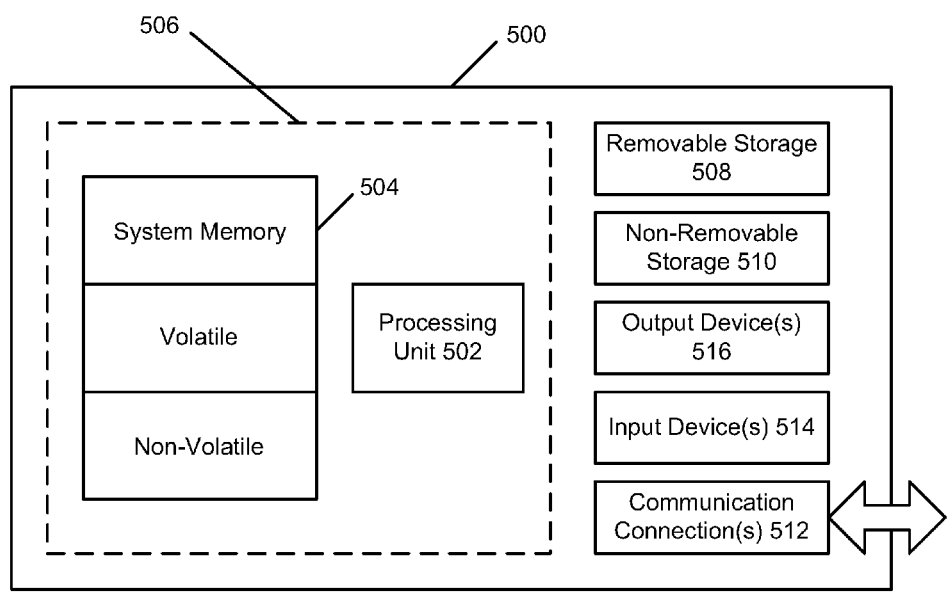
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method comprising:
 receiving a graph comprising a plurality of edges from an application, by a computing device through a network, wherein each edge is associated with two nodes;
 generating a plurality of subgraphs of the received graph by the computing device;

generating a plurality of spanners from the plurality of subgraphs by the computing device;
generating a sparsifier using the generated plurality of spanners by the computing device, wherein the sparsifier is generated without solving one or more linear equations to reduce an amount of computing resources used by the computing device;
estimating a robust connectivity of each edge in the generated sparsifier by the computing device; and
setting a weight of each edge in the generated sparsifier based on the estimated robust connectivity for the edge in the generated sparsifier; and
providing the generated sparsifier to the application by the computing device through the network, wherein the application performs one or more graph operations for the graph using the generated sparsifier to reduce an amount of computing resources used by the application.

2. The method of claim 1, wherein generating the plurality of subgraphs from the received graph comprises, for each subgraph in the plurality of subgraphs, sampling edges of the plurality of edges, and adding the sampled edges to the subgraph.

3. The method of claim 2, wherein sampling edges comprises randomly sampling edges.

4. The method of claim 2, wherein a number of edges sampled for each subgraph decreases according to a rate.

5. The method of claim 4, wherein the rate is a geometric rate.

6. The method of claim 1, wherein generating the sparsifier using the generated plurality of spanners comprises generating the sparsifier using a union of the generated plurality of spanners.

7. The method of claim 1, wherein setting the weight of each edge in the generated sparsifier based on the estimated robust connectivity for the edge in the generated sparsifier comprises setting the weight based on the inverse of the robust connectivity.

8. The method of claim 1, wherein each spanner is associated with a sampling probability, and estimating the robust connectivity of an edge in the generated sparsifier comprises:
determining a spanner where an estimated distance between the nodes associated with the edge is greater than a threshold; and
estimating the robust connectivity of the edge in the generated sparsifier based on the sampling probability of the determined spanner.

9. The method of claim 8, wherein the threshold is based on the number of nodes in the graph.

10. The method of claim 9, wherein the threshold is a log of the number of nodes in the graph.

11. The method of claim 1, wherein the application is a networking application or a search engine.

12. A method comprising:
receiving a plurality of spanners for a graph by a computing device, wherein each spanner comprises a plurality of edges and each edge is associated with two nodes;
generating a sparsifier using a union of the edges of the plurality of spanners by the computing device, wherein the sparsifier is generated without solving one or more linear equations to reduce an amount of computing resources used by the computing device;
for each edge in the sparsifier:
estimating a robust connectivity of the edge by the computing device; and
setting a weight for the edge based on the estimated robust connectivity for the edge by the computing device; and
providing the generated sparsifier to an application by the computing device through a network, wherein the application performs one or more graph operations for the graph using the generated sparsifier to reduce an amount of computing resources used by the application.

13. The method of claim 12, wherein setting a weight for the edge based on the estimated robust connectivity for the edge comprises setting a weight for the edge based on an inverse of the estimated robust connectivity.

14. The method of claim 12, wherein each spanner is associated with a sampling probability and estimating a robust connectivity of the edge comprises:
determining a spanner where an estimated distance between the nodes associated with the edge is greater than a threshold; and
estimating the robust connectivity as the sampling probability of the determined spanner.

15. The method of claim 14, wherein the threshold is based on the number of nodes in the graph.

16. The method of claim 15, wherein the threshold is a log of the number of nodes in the graph.

17. A system comprising:
at least one computing device;
a sparsifier engine adapted to:
generate a sparsifier for a graph using a union of a plurality of spanners, wherein each spanner is associated with a sampling probability, the sparsifier is generated without solving one or more linear equations to reduce an amount of computing resources used by the sparsifier engine, each spanner comprises a plurality of edges, and each edge is associated with two nodes; and
for each edge in the sparsifier:
select a spanner from the plurality of spanners with a greatest sampling probability;
estimate a distance between the nodes associated with the edge in the selected spanner;
determine if the estimated distance is greater than a threshold; and
if so, set a weight for the edge based on the sampling probability of the selected spanner; and
provide the generated sparsifier through a network; and
an application adapted to:
receive the generated sparsifier through the network; and
perform one or more graph operations for the graph using the generated sparsifier to reduce an amount of computing resources used by the application.

18. The system of claim 17, wherein the sparsifier is a spectral sparsifier.

19. The system of claim 17, wherein setting a weight for the edge based on the sampling probability of the selected spanner comprises setting the weight for the edge based on the inverse of the sampling probability.

* * * * *